(12) United States Patent
Chang

(10) Patent No.: US 7,995,077 B2
(45) Date of Patent: Aug. 9, 2011

(54) PORTABLE ELECTRONIC DEVICE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 730 days.

(21) Appl. No.: 12/135,845

(22) Filed: Jun. 9, 2008

(65) Prior Publication Data

US 2009/0027420 A1 Jan. 29, 2009

(30) Foreign Application Priority Data

Jul. 27, 2007 (CN) .......................... 2007 1 0201195

(51) Int. Cl.
*G09G 5/00* (2006.01)
(52) U.S. Cl. ............ 345/649; 345/659; 345/41; 345/48; 361/679.55
(58) Field of Classification Search .................. 345/649, 345/659, 41, 48; 361/679.55
See application file for complete search history.

(56) References Cited

U.S. PATENT DOCUMENTS

| 4,969,647 | A | | 11/1990 | Mical et al. |
| 5,764,223 | A | * | 6/1998 | Chang et al. .................. 345/175 |
| 2005/0070347 | A1 | * | 3/2005 | Ogura ........................ 455/575.1 |
| 2005/0231499 | A1 | * | 10/2005 | Wang et al. .................... 345/207 |
| 2006/0077211 | A1 | * | 4/2006 | Zhou ............................. 345/650 |
| 2008/0111779 | A1 | * | 5/2008 | Matsumoto ...................... 345/87 |
| 2008/0309679 | A1 | * | 12/2008 | Chang ........................... 345/649 |

FOREIGN PATENT DOCUMENTS

| CN | 1694059 A | 11/2005 |
| CN | 1940823 A | 4/2007 |

* cited by examiner

*Primary Examiner* — M Good Johnson
(74) *Attorney, Agent, or Firm* — Andrew C. Cheng

(57) ABSTRACT

A portable electronic equipment includes a main body, a display screen, an orientation sensing module and a display controlling module. The display screen is arranged on the main body for displaying an image in an original orientation. The orientation sensing module includes a first elongated chamber, a first sensing unit, a second sensing unit, an opaque medium partially filled in the first elongated chamber and an air pocket received in the first elongated chamber. The display controlling module is configured for deviating the displayed image at a given angle clockwise or counterclockwise from the original orientation of the image.

9 Claims, 9 Drawing Sheets

(a)

(b)

PORTABLE ELECTRONIC DEVICE

BACKGROUND

1. Technical Field

The present invention relates to portable electronic devices, and particularly, to a portable electronic device having a capability of adjusting orientation of displayed images by sensing orientation of the portable electronic device.

2. Description of Related Art

Referring to FIG. 9(a), a typical display screen 10 is provided. The display screen 10 is rectangular, and has two long sides 11 and two short sides 12. The orientation of an image displayed on the display screen 10 does not change corresponding to the orientation of the display screen 10. Such that, the image "H" displayed on the display screen 10 will no longer appear in an upright orientation if the display screen 10 is turned over on its long sides 11 (FIG. 9b).

Therefore, what is needed is a portable electronic device, which can adjust orientation of an image displayed therein to correspond with changing orientation of the portable electronic device.

SUMMARY

A portable electronic device, in accordance with a present embodiment, is provided. The display device includes a main body and a display screen arranged on the main body for displaying an image in an original orientation. Also included are an orientation sensing module and a display controlling module. The orientation sensing module includes a first elongated chamber, a first sensing unit, a second sensing unit, an opaque liquid medium filled in the first elongated chamber and an air pocket received in the first elongated chamber. The first sensing unit includes a first light source for emitting light and a first photo detector arranged at opposite sides of the first portion of the first elongated chamber, the first photo detector is configured for detecting light emitted from the first light source and generating a first sensing signal. The second sensing unit includes a second light source for emitting light and a second photo detector arranged at opposite sides of the second portion of the first elongated chamber, the second photo detector is configured for detecting light emitted from the second light source and generating a second sensing signal. The air pocket is flowable through the first portion or the second portion of the first elongated chamber, and configured for allowing transmission of the light from the first and second light sources to the first and second photo detectors respectively. The display controlling module is configured for deviating the displayed image at a given angle clockwise or counterclockwise from the original orientation of the image based on the first and second sensing signals.

Other advantages and novel features will become more apparent from the following detailed description of embodiments, when taken in conjunction with the accompanying drawings.

BRIEF DESCRIPTION OF THE DRAWINGS

Many aspects of the present portable electronic device can be better understood with reference to the following drawings. The components in the drawings are not necessarily drawn to scale, the emphasis instead being placed upon clearly illustrating the principles of the present portable electronic device. Moreover, in the drawings, like reference numerals designate corresponding parts throughout the several views.

The exemplifications set out herein illustrate various preferred embodiments, in various forms, and such exemplifications are not to be construed as limiting the scope of the present portable electronic device in any manner.

DETAILED DESCRIPTION

Figure 1:
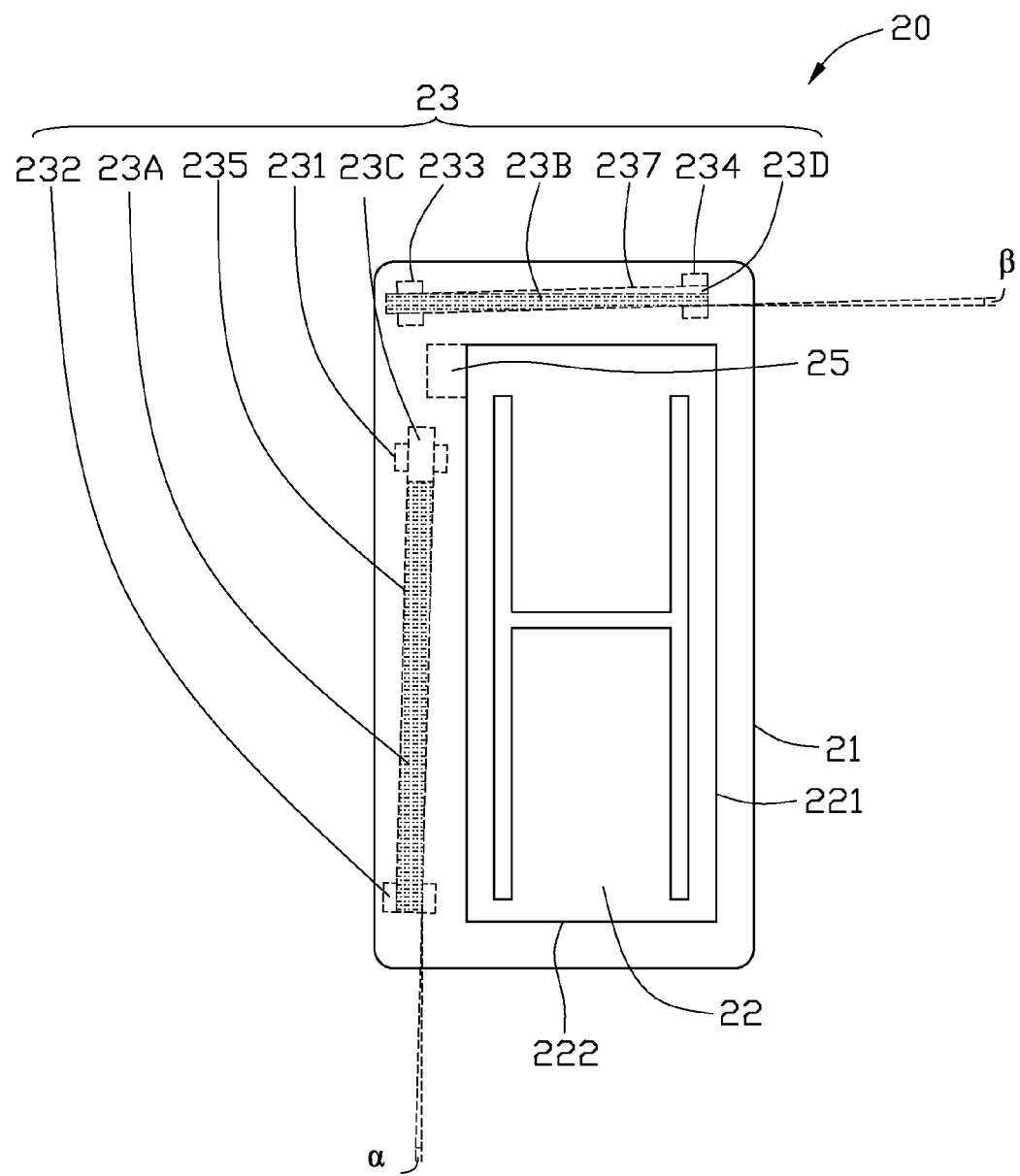
FIG. 1 is a principal structural view of the portable electronic device in a first orientation showing an image in a similar orientation, in accordance with the first device.

Referring to FIG. 1, a portable electronic device 20 in accordance with a first exemplary embodiment, is provided. The portable electronic device 20 includes a main body 21, a rectangle display screen 22 arranged on the main body 21, an orientation sensing module 23 and a display controlling module 25.

The display screen 22 (generally also defined as display panel) includes two long sides 221 and two short sides 222 and is configured for displaying an image.

Figure 2:
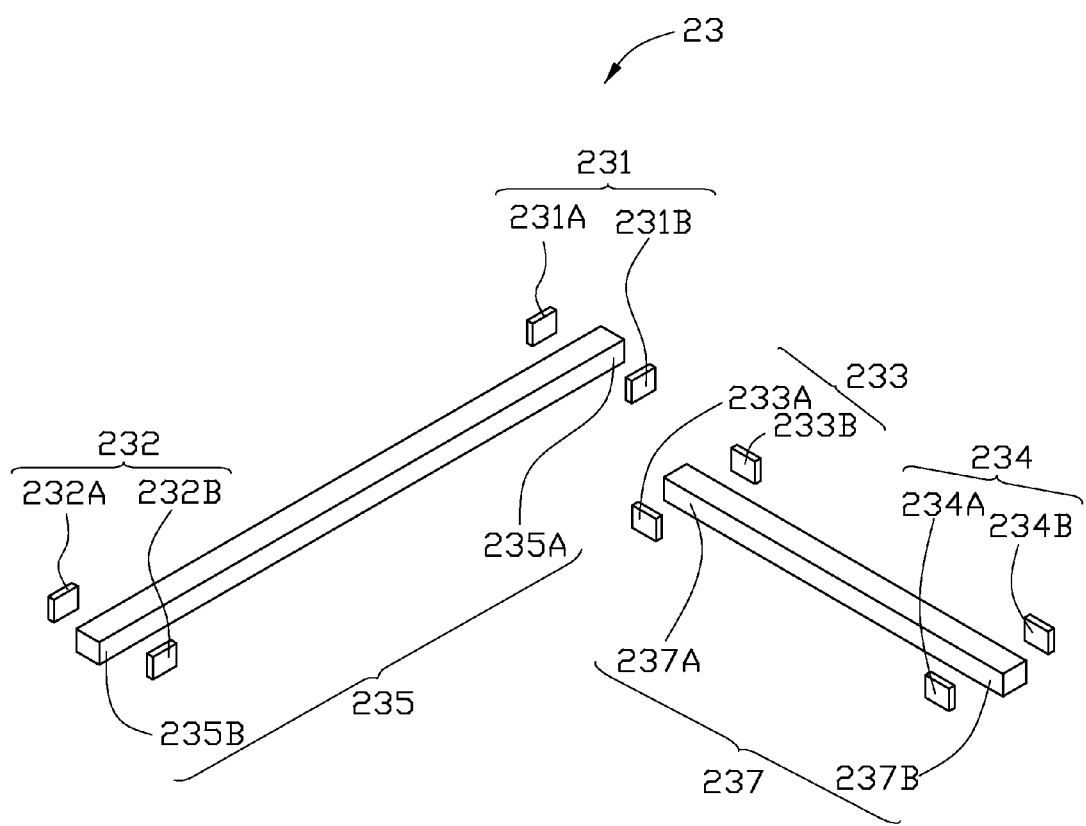
FIG. 2 is an exploded view of an orientation sensing module in the portable electronic device of FIG. 1.

As shown in FIGS. 1 and 2, the orientation sensing module 23 includes a first sensing unit 231, a second sensing unit 232, a third sensing unit 233, a fourth sensing unit 234, a first elongated chamber 235 and a second elongated chamber 237. The first elongated chamber 235 includes a first portion 235A and a second portion 235B. The first sensing unit 231 includes a first light source 231A and a first photo detector 231B arranged at opposite sides of the first portion 235A of the first elongated chamber 235. The second sensing unit 232 includes a second light source 232A and a second photo detector 233B arranged at opposite sides of the second portion 235B of the first elongated chamber 235. A liquid medium 23A and an air pocket 23C are received in the first elongated chamber 235. The air pocket 23C is flowable through the first portion 235A or the second portion 235B of the first elongated chamber 235. Similarly, the second elongated chamber 237 includes a first portion 237A and a second portion 237B. The third sensing unit 233 includes a third light source 233A and a third photo detector 233B arranged at opposite sides of the first portion 237A of the second elongated chamber 237. The fourth sensing unit 234 includes a fourth light source 234A and a fourth photo detector 234B arranged at opposite sides of the second portion 237B of the second elongated chamber 237. A liquid medium 23B and an air pocket 23D are received in the second elongated chamber 237. The air pocket 23D is flowable through the first portion 237A or the second portion 237B of the second elongated chamber 237. Furthermore, the first and second elongated chambers 235, 237 are light-pervious, the liquid mediums 23A, 23B can respectively be opaque liquid medium, such as black ink or a liquid with black dye mixed therein.

Generally, the first, second, third and the fourth light sources 231A, 232A, 233A and 234A can respectively be a light emitting diode (LED). The first, second, third and the fourth photo detectors 231B, 232B, 233B and 234B can respectively be a photoelectric diode, which are respectively electrically connected to the display controlling module 25. It should be noted, that the first and second elongated chambers 235, 237 should only partially filled with the liquid mediums 23A and 23B, since the liquid mediums 23A and 23B are desired to be flowable therein respectively.

As shown in FIG. 1, the portable electronic device 20 is in a first orientation, the first sides 221 of the display screen 22 are perpendicular to the ground with the first sensing unit 231 higher than the second sensing unit 232. The liquid medium 23A flows downwardly to the second portion 235B of the first elongated chamber 235 due to gravitational force acting thereupon, that is, the air pocket 23C is flowable through the first portion 235A of the first elongated chamber 235. The light emitted from the first light source 231A transmits to the first photo detector 231B via the first elongated chamber 235. Therefore the first photo detector 231B is excited by the light to generate a first sensing signal, and the first sensing signal is then sent to the display controlling module 25. As a result, the display controlling module 25 controls the orientation of the image displayed. As shown in FIG. 1, the orientation of the image "H" is controlled by the display controlling module 25 to be displayed corresponds to the orientation of the portable electronic device 20, and the image is in an upright orientation.

Figure 3:
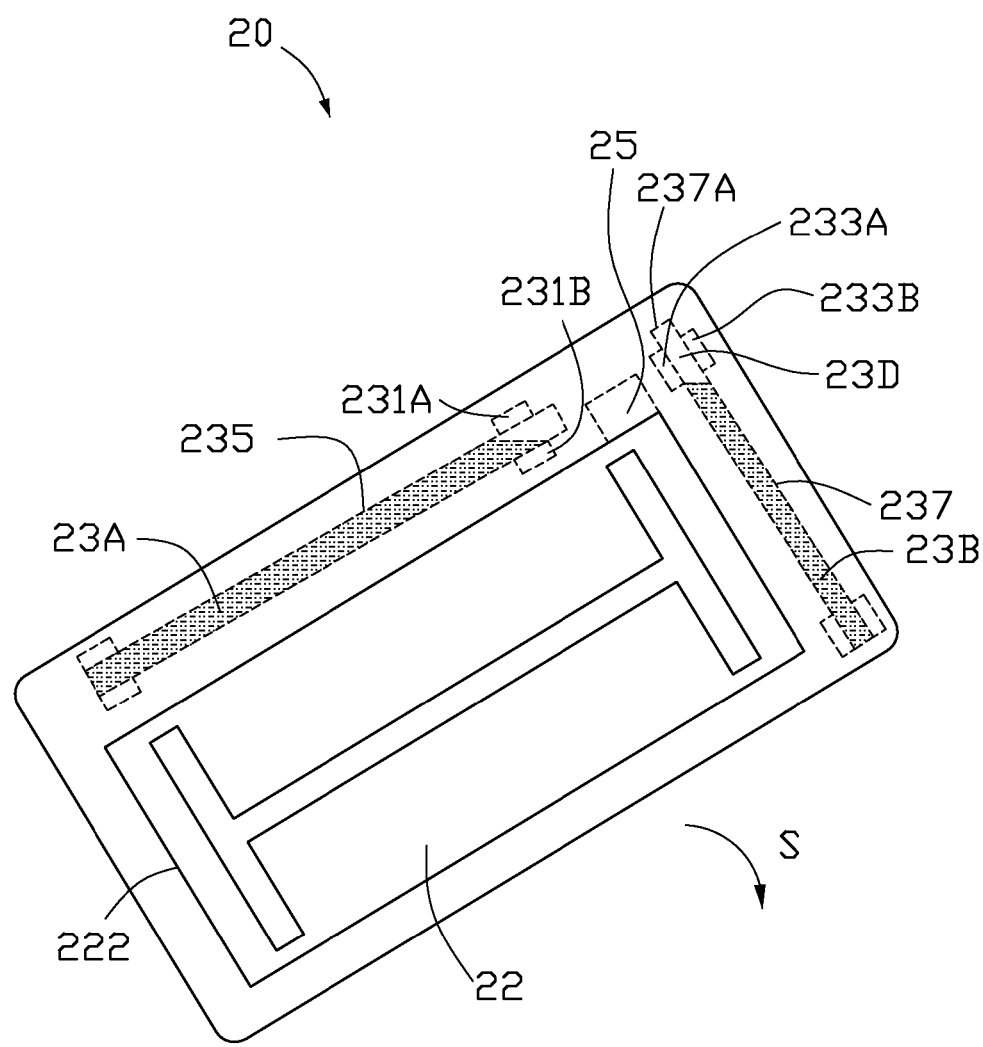
FIG. 3 is a schematic view of the portable electronic device of FIG. 1 during rotation to a second orientation showing the image adjusting correspondingly.
Figure 4:
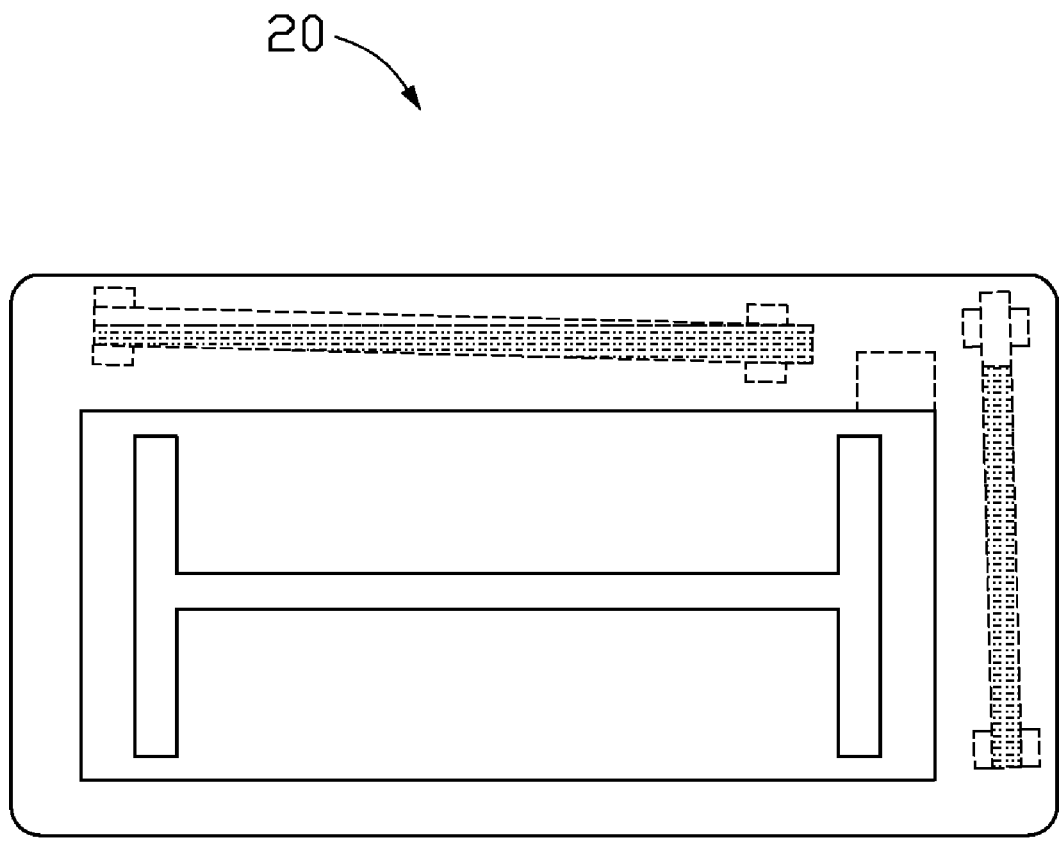
FIG. 4 is a view of the portable electronic device of FIG. 1 in the second orientation.

Referring to FIGS. 3 and 4, the portable electronic device 20 is rotated clockwise (the rotating direction is shown by the arrowhead S in FIG. 3) 90 degrees from the first orientation to a second orientation as shown in FIG. 4. During rotation, the liquid mediums 23A, 23B in the first and second elongated chamber 235, 237 flow gradually with the rotating direction. The light emitted from the first light source 231A is prevented from transmitting through the first elongated chamber 235 by the liquid medium 23A therein. While the air pocket 23D is flowable through the first portion 237A of the second elongated chamber 237, the light emitted from the third light source 233A transmits to the third photo detector 233B through the second elongated chamber 237. Then the second photo detector 233B generates a third sensing signal, and the third sensing signal is sent to the display controlling module 25. The display controlling module 25 then adjusts the lateral sides of the image to be displayed parallel to the short side 222 of the display screen 22. Once the portable electronic device 20 is in a second orientation, the orientation of the image is adjusted corresponding to the orientation of the portable electronic device 20, and the image is adjusted to appear upright, as shown in FIG. 4.

Figure 5:
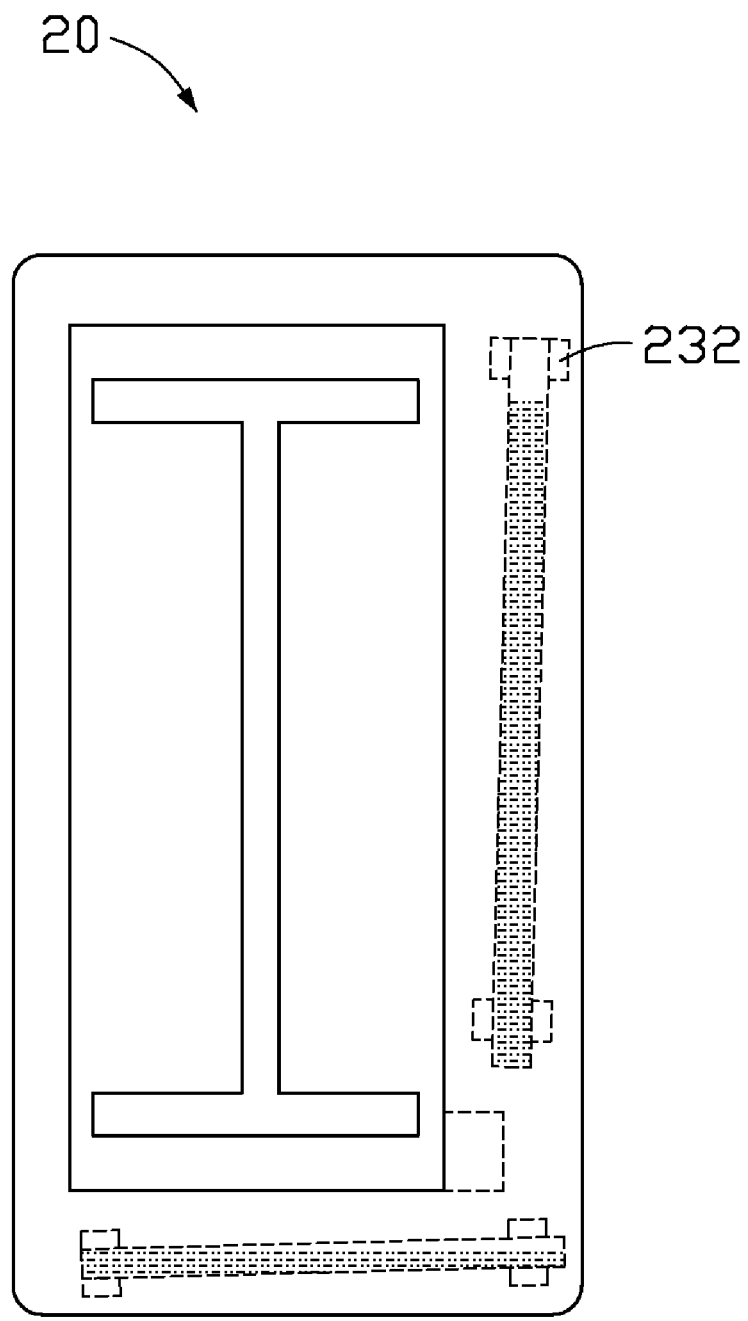
FIG. 5 is a view of the portable electronic device of FIG. 1 in the third orientation.
Figure 6:
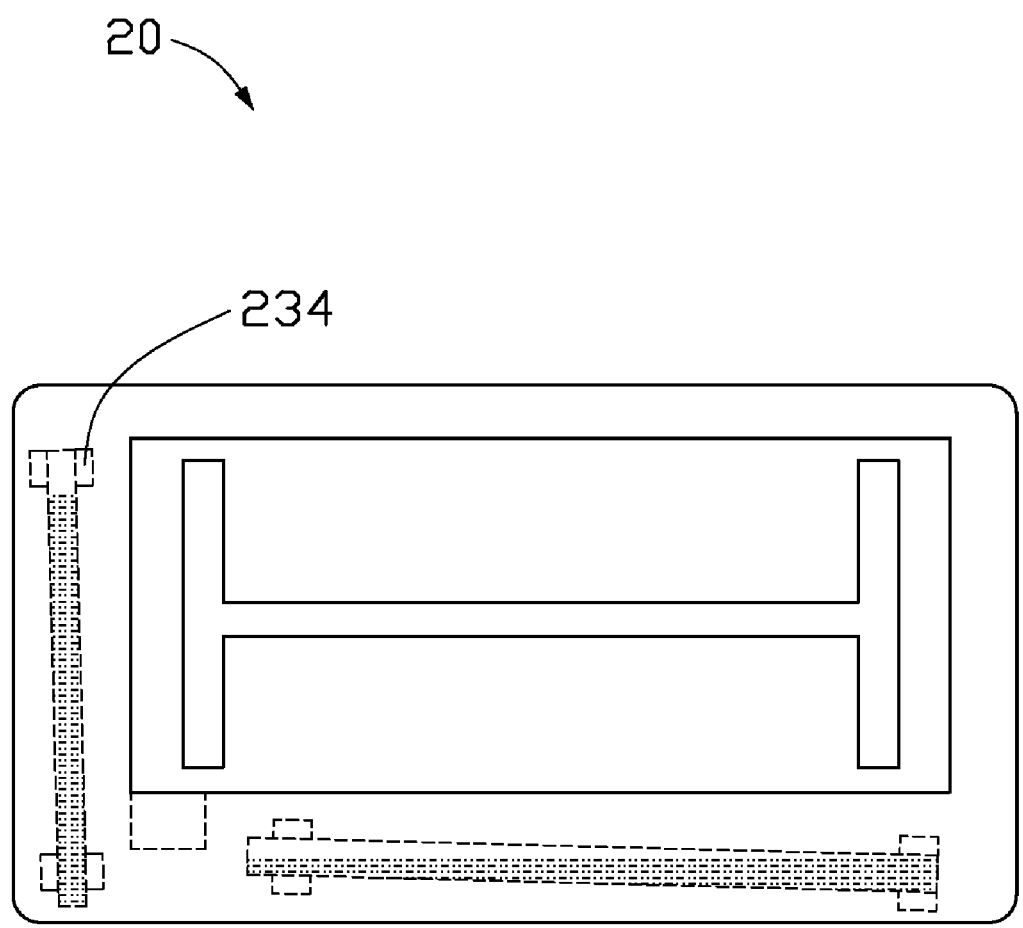
FIG. 6 is a view of the portable electronic device of FIG. 1 in the fourth orientation.

Even if the portable electronic device 20 is rotated a full 180 degrees (as shown in FIG. 5) clockwise to an up side down position (third orientation), or a fourth orientation (a position being rotated a full 180 degrees from the second orientation, as shown in FIG. 6), the orientation of the image can also be adjusted corresponding to the orientation of the portable electronic device 20. That is, the second sensing unit 232 and the fourth sensing unit 234 generate a second sensing signal and a fourth sensing signal respectively, and the image is adjusted to appear upright.

The main body 21 can be cuboid-shaped, such that the portable electronic device 20 can be steadily arranged on a flat surface (not label). Preferably, a first angle $\alpha$ is defined between the first elongated chamber 235 and the first sides 221 of the display screen 22, and a second angle $\beta$ is defined between the second elongated chamber 237 and the second side 222 of the display screen 22. Therefore, the liquid mediums 23A and 23B received in the first and second elongated chambers 235, 237 respectively, is steadily leveled, and the orientation of the portable electronic device 20 can be precisely detected, as the portable electronic device 20 is arranged on the flat surface. For better performance, the first and second angles $\alpha$, $\beta$ are in a range from one to five degrees respectively.

It should be noted that the portable electronic device 20 is not limited to have the above-mentioned first embodiment, the portable electronic device described in below embodiments, are acceptable as well.

Figure 7:
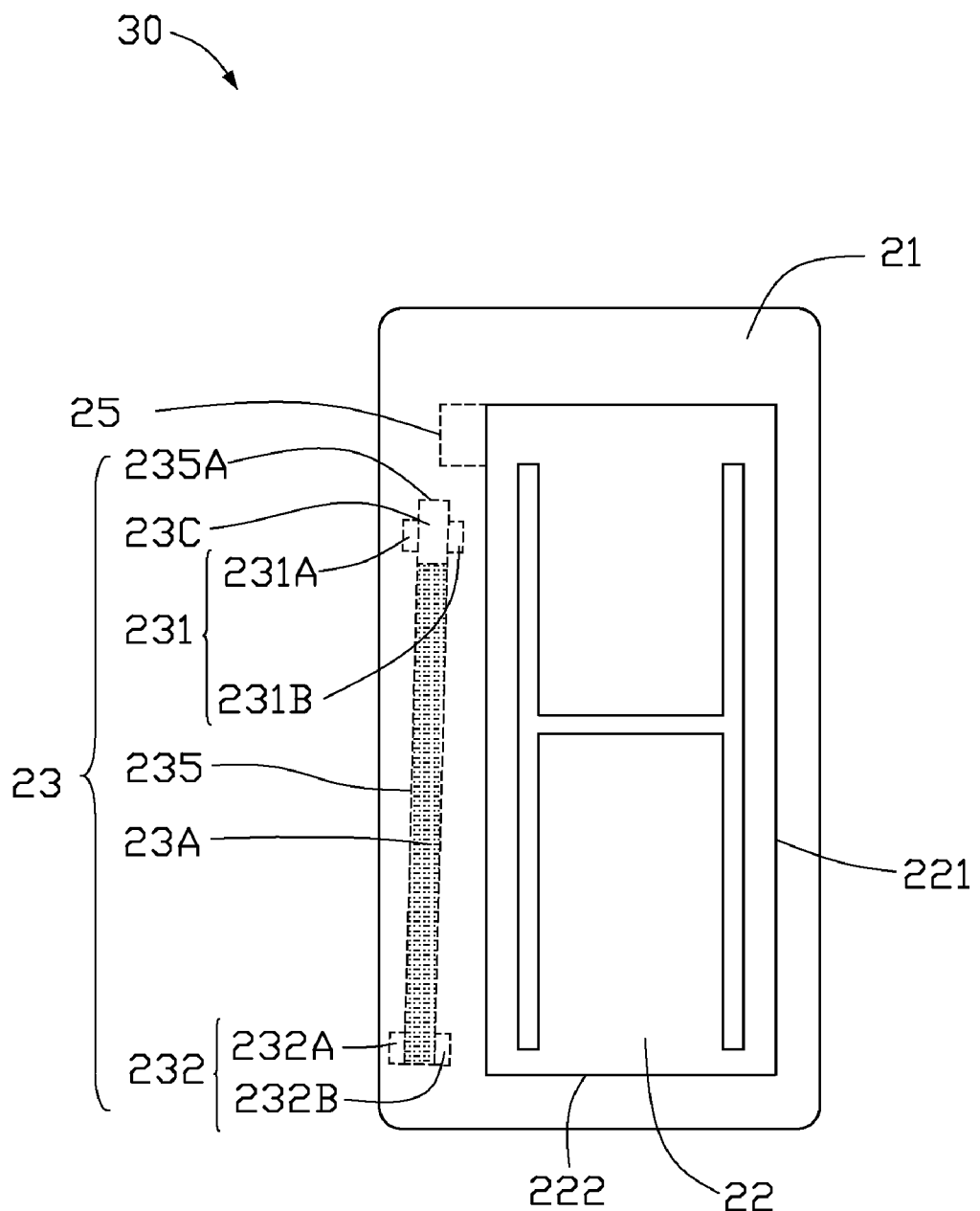
FIG. 7 is a principal structural view of the portable electronic device in a first orientation showing an image in a similar orientation, in accordance with the second embodiment.

FIG. 7 shows a display device 30, in accordance with the second embodiment. The display device 30 is distinguished from the display device 20 in that an orientation sensing module 23 includes only two sensing units (first sensing unit 231 and second sensing unit 232).

Figure 8:
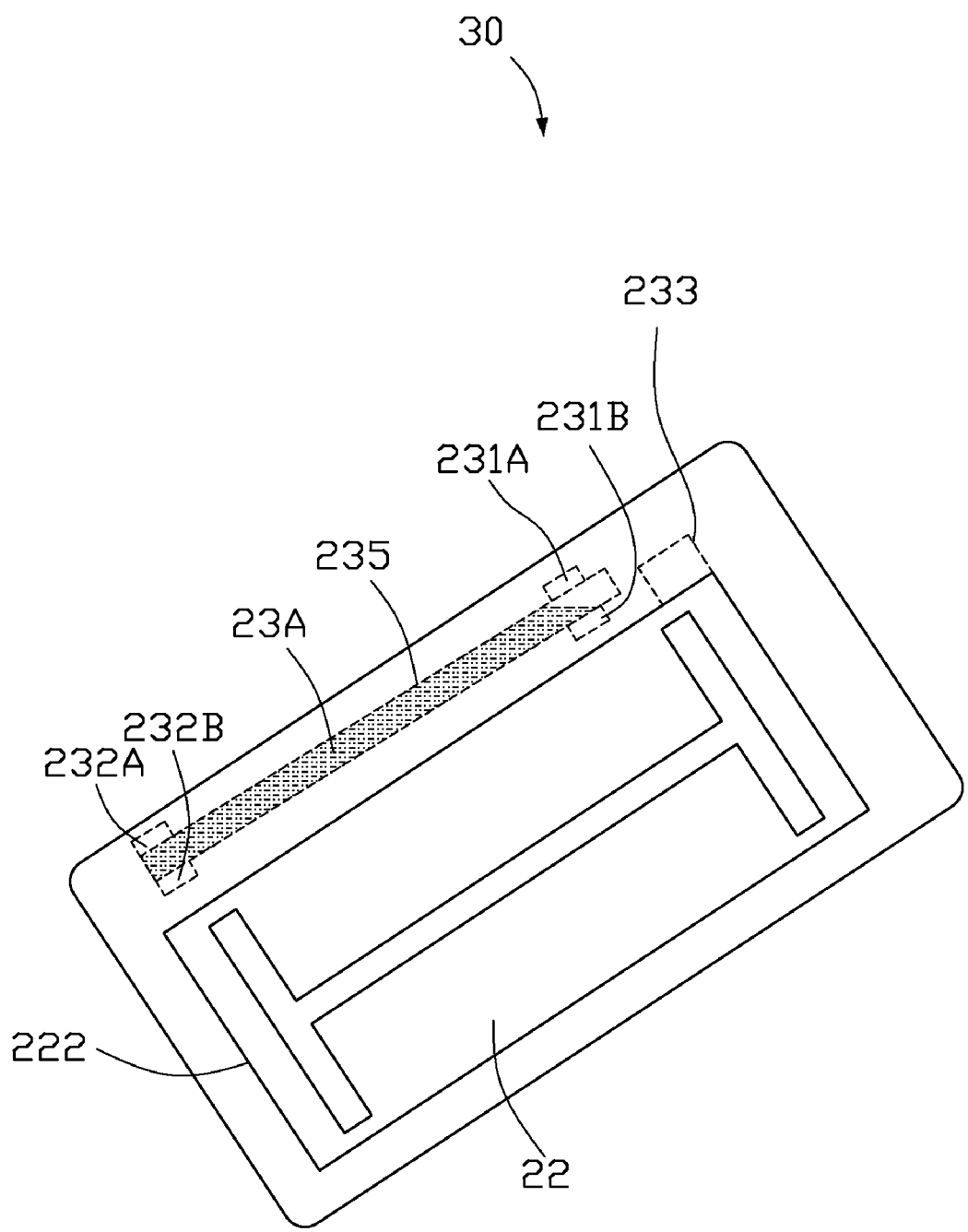
FIG. 8 is a schematic view of the portable electronic device of FIG. 7 during rotation to a second orientation showing the image adjusting correspondingly.
Figure 9:
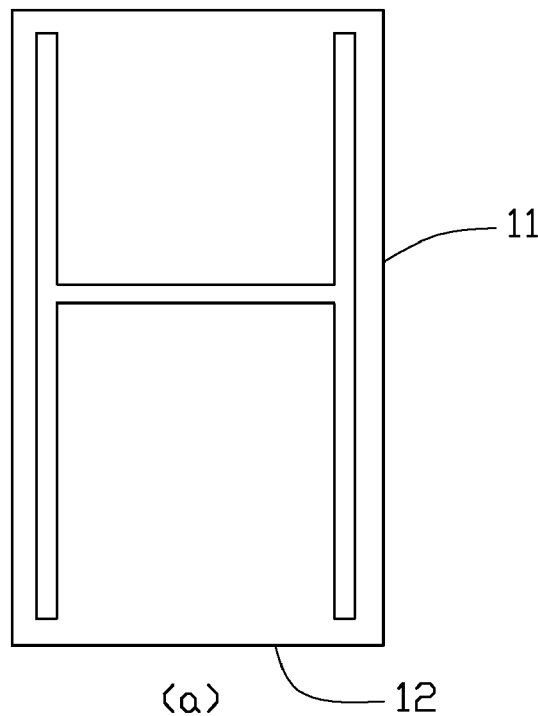
FIG. 9(a) is a view of a typical display screen in an upright orientation.
FIG. 9(b) is a view of a typical display screen turned over on its long sides.
Figure 9:
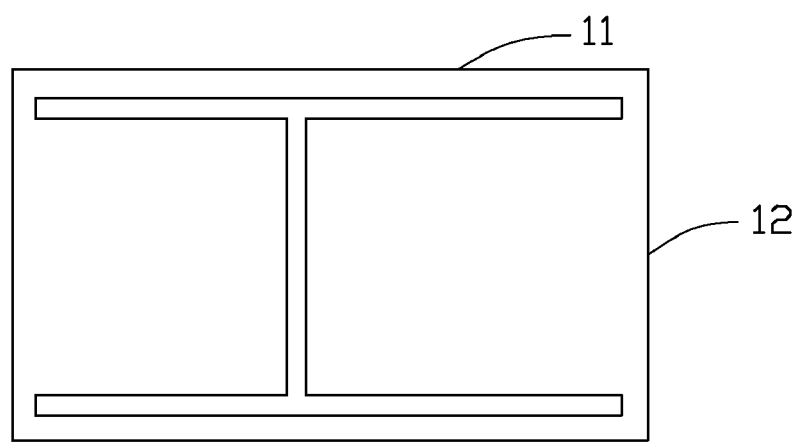

Referring to FIG. 8. In operation, as the light emitted from first or second light sources 231A, 232A transmits to respectively first and second photo detectors 231B, 232B through the first elongated chamber 235, an image is displayed with lateral sides thereof parallel to the long side 221 of the display screen 22, or parallel to the short side 222 of the display screen 22. As shown in FIG. 7, the display device 30 is in a first orientation, and the air 23C is flowable through the first portion 235A of the first elongated chamber 235. Then the light emitted from the first light source 231A transmits to the first photo detector 231B through the first elongated chamber 235. Therefore, the first photo detector 231B sent a first sensing signal to the display controlling module 25, and the display controlling module 25 controls the orientation of the displayed image. As shown in FIG. 7, an image "H" is displayed in an upright orientation. Furthermore, as shown in FIG. 8, the display device 30 is during rotation to a second orientation, the light emitted from the first and second light sources 231A, 232A are prevented from transmitting to the first and second photo detectors 231B, 232B respectively through the first elongated chamber 235 by the liquid medium 23A. As a result, the display controlling module 25 controls the orientation of the displayed image, and the image is displayed with lateral sides thereof parallel to the second side 222 of the display screen 22.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:
1. A portable electronic device, comprising:
a main body;
a display screen arranged on the main body for displaying an image in an original orientation;
an orientation sensing module including
a first elongated chamber having a first portion and a second portion,
a first sensing unit comprising a first light source for emitting light and a first photo detector arranged at opposite sides of the first portion of the first elongated chamber, the first photo detector configured for detecting light emitted from the first light source and generating a first sensing signal, and a second sensing unit comprising a second light source for emitting light and a second photo detector arranged at opposite sides of the second portion of the first elongated chamber, the second photo detector configured for detecting light emitted from the second light source and generating a second sensing signal, and an opaque liquid medium partially filled in the first elongated chamber, and an air pocket received in the first elongated chamber, the air pocket being flowable through the first portion or the second portion of the first elongated chamber, the air pocket configured for allowing transmission of the light from the first and second light sources to the first and second photo detectors respectively;

a display controlling module for deviating the displayed image at a given angle clockwise or counterclockwise from the original orientation of the image based on the first and second sensing signals.

2. The portable electronic device of claim 1, wherein the first and second sensing unit are located at opposite ends of the first elongated chamber.

3. The portable electronic device of claim 1, further comprising a second elongated chamber having a first portion and a second portion, a third sensing unit comprising a third light source for emitting light and a third photo detector arranged at opposite sides of the first portion of the second elongated chamber, the third photo detector configured for detecting light emitted from the third light source and generating a third sensing signal, and a fourth sensing unit comprising a fourth light source for emitting light and a fourth photo detector arranged at opposite sides of the second portion of the second elongated chamber, the fourth photo detector configured for detecting light emitted from the fourth light source and generating a fourth sensing signal, and an opaque liquid medium partially filled in the first elongated chamber, an air pocket received in the first elongated chamber, the air pocket being flowable through the first portion or the second portion of the first elongated chamber, the air pocket configured for allowing transmission of the light from the first and second light sources to the first and second photo detectors respectively, the display controlling module for deviating the displayed image at the given angle clockwise or counterclockwise from the original orientation of the image based on the third and fourth sensing signals.

4. The portable electronic equipment of claim 3, wherein each of the first, second, third and the fourth photo detectors is a photoelectric diode.

5. The portable electronic equipment of claim 3, wherein the opaque liquid medium received in the first elongated chamber and the second elongated chamber is black ink or a liquid with black dye mixed therein.

6. The portable electronic equipment of claim 3, wherein the display screen is rectangular and includes two long sides and two short sides, a first angle defined between the first elongated chamber and the first sides of the display screen, and the first angle being in a range from one to five degrees.

7. The portable electronic equipment of claim 6, wherein a second angle is defined between the second elongated chamber and the second side of the display screen, the second angle being in a range from one to five degrees.

8. A portable electronic device, comprising:
a main body;
a display screen arranged on the main body for displaying an image in an original orientation;
an orientation sensing module including
a first elongated chamber having a first portion and a second portion,
a first sensing unit comprising a first light source for emitting light and a first photo detector arranged at opposite sides of the first portion of the first elongated chamber, the first photo detector configured for detecting light emitted from the first light source and generating a first sensing signal, and
a second sensing unit comprising a second light source for emitting light and a second photo detector arranged at opposite sides of the second portion of the first elongated chamber, the second photo detector configured for detecting light emitted from the second light source and generating a second sensing signal, and
an opaque liquid medium partially filled in the first elongated chamber, and
an air pocket received in the first elongated chamber, the air pocket being flowable through the first portion or the second portion of the first elongated chamber, the air pocket configured for allowing transmission of the light from the first and second light sources to the first and second photo detectors respectively, and
a second elongated chamber having a first portion and a second portion,
a third sensing unit comprising a third light source for emitting light and a third photo detector arranged at opposite sides of the first portion of the second elongated chamber, the third photo detector configured for detecting light emitted from the third light source and generating a third sensing signal, and
a fourth sensing unit comprising a fourth light source for emitting light and a fourth photo detector arranged at opposite sides of the second portion of the second elongated chamber, the fourth photo detector configured for detecting light emitted from the fourth light source and generating a fourth sensing signal,
an opaque liquid medium partially filled in the second elongated chamber, and an air pocket received in the second elongated chamber, the air pocket being flowable through the first portion or the second portion of the second elongated chamber, the air pocket configured for allowing transmission of the light from the third and fourth light sources to the third and fourth photo detectors respectively;
a display controlling module for deviating the displayed image at a given angle clockwise or counterclockwise from the original orientation of the image based on the first, second, third and the fourth sensing signals.

9. The portable electronic device of claim 8, wherein the display controlling module is configured for deviating the displayed image at 90 degrees clockwise or counterclockwise from original orientation of the image.

* * * * *